Dec. 9, 1969   R. L. DE BIASSE   3,482,468
CONNECTING RODS
Filed March 4, 1968
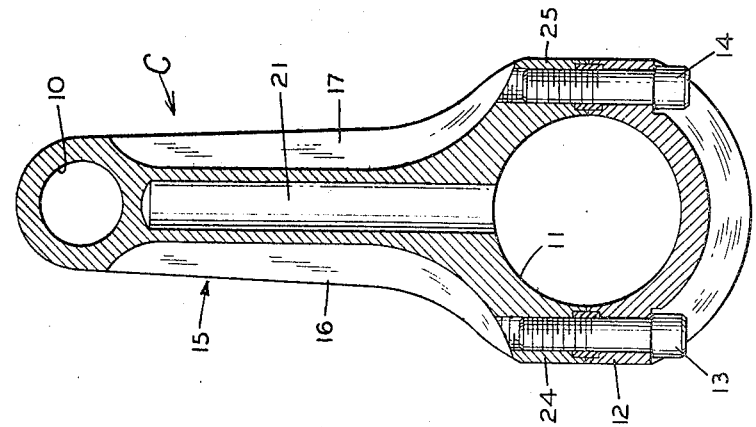
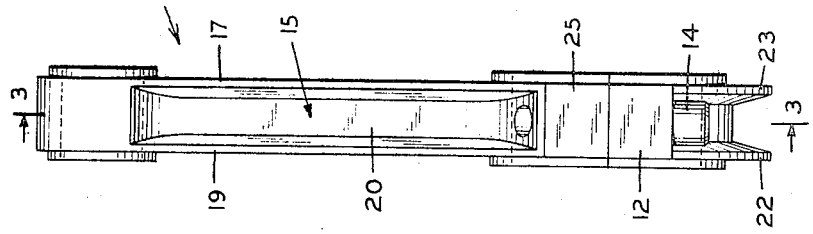
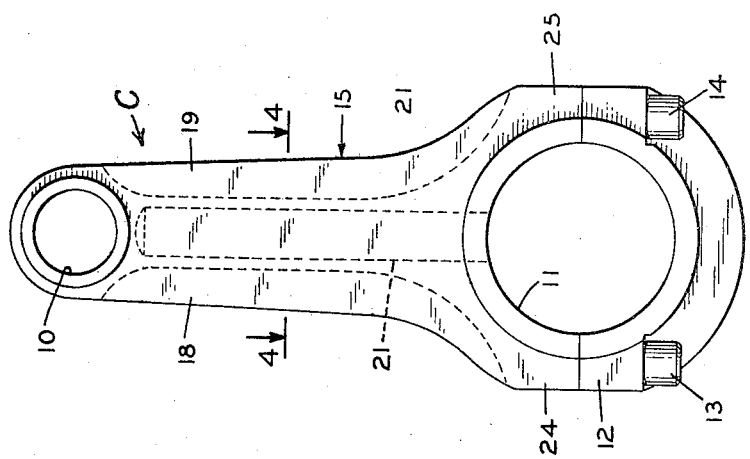
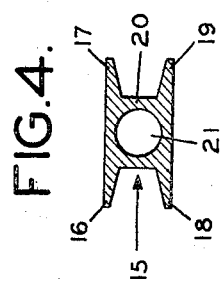
INVENTOR
RICHARD L. DE BIASSE
BY
HIS ATTORNEYS United States Patent Office 3,482,468
Patented Dec. 9, 1969

3,482,468
CONNECTING RODS
Richard L. De Biasse, 3 Oak St.,
Madison, N.J. 07940
Filed Mar. 4, 1968, Ser. No. 709,980
Int. Cl. G05g 1/00, 3/00
U.S. Cl. 74—579                                     3 Claims

ABSTRACT OF THE DISCLOSURE

A lightweight connecting rod for high speed (high r.p.m.) engines, the rod having an H-shaped cross-section with the cross bar of the H being a tubular strut extending lengthwise of the connecting rod to render the rod highly resistant to deformation by tension, compression and bending stresses.

---

This invention relates to improvements in connecting rods for internal combustion engines and more particularly to lightweight connecting rods capable of withstanding and reducing the stresses developed in internal combustion engines operating at 7500 r.p.m. and higher.

In the development of so-called competition engines, that is, racing and sports car engines, developing high horsepower with a relatively limited piston displacement, research and technology has attained a state wherein the cam shafts and valve trains of the engines are no longer a limitation on the rotational speed of the engine. The same is true of carburation and ignition so that the problems remaining for the production of engines capable of operating at higher r.p.m.'s involve the stresses induced in the bearings, connecting rods, pistons and related components. Among the common failures occurring in competition engines are the breaking of the connecting rods or destruction of the bearings due to the enormous stresses developed by the high operating speeds of the engines. The most destructive loads imposed on the bearings, connecting rods and pistons are those imposed by inertia at top dead center during the exhaust stroke of the engine where the inertia loads are the highest and the opposing gas forces are the least. These inertia forces are taken by the connecting rods and failure of the connecting rods has become quite common with resulting damage to or destruction of the engine. In order to overcome this defect, two courses of development are open, namely, decreasing the weight of the reciprocating parts, that is, the connecting rod and the piston, or increasing the strength of the connecting rod. These problems have long been recognized and lightweight pistons, such as, for example, the pistons disclosed in my United States application Ser. No. 669,905, filed Sept. 22, 1967, have been developed for reducing the weight of this component.

In general, two types of connecting rods have been provided heretofore, namely, rods of I-beam cross-section and solid cylindrical or tubular rods. Both of these types of rods are heavy, weighing on the order of 900 to 1000 grams for an engine in the piston displacement range of 280 to 330 cubic inches. Even the best of these connecting rods cannot be operated for any substantial period of time at a speed above 7500 r.p.m. without failing for one or several reasons, including deformation of the small bearing end of the rod which engages the piston pin, deformation or destruction of the large bearing for receiving the crank shaft, or bending or breakage of the rod due to the forces exerted thereon.

Rods of other cross-section have been suggested heretofore. For example, an H-beam type of rod has been proposed. The H-section rod, while having greater rigidity than either the solid, tubular or I-beam types of rods, has very poor characteristics at high r.p.m. with a maximum of about 2750 r.p.m. for aircraft use. These characteristics are not caused by a lack of rigidity of the rod but rather because the webs making up the H-shape have a tendency to ripple or bend at higher engine speeds which in turn causes crystallization and failure of the rods. Increasing the cross-section of such connecting rods does appear to materially improve their performance but has a disadvantageous effect of greatly increasing their weight and the corresponding inertia forces.

The tubular connecting rod has considerable stiffness or rigidity up to the point where flexing during operation exceeds the elastic limit of the rod. Beyond the elastic limit, the rod buckles with resulting blowing of or damage to the engine.

A factor which apparently has not been taken into consideration heretofore in the production of connecting rods is the fact that at points between top dead center and bottom dead center of the piston in the cylinder, the rods are subjected to very high bending stresses in addition to compression and tension stresses. The bending stresses have a tendency to cause a rod to buckle or bend and this frequently is the cause of the breakage of the connecting rod even when it is strong enough to stand the inertia forces exerted thereon.

As an example of the inertia forces to which connecting rods are subjected, a competition (racing) type of eight cylinder engine having a 283 cubic inch displacement when operated at 7500 r.p.m. and having a piston (with pin) weight of 870 grams and a rod weight of 620 grams is subjected to a load of 5800 pounds. The load is not high enough to cause immediate failure of the rod but may cause rod damage in engines which are operated for long periods of time, such as in twelve or twenty-four hour races.

If the piston weight can be reduced to 460 grams and the rod weight to 390 grams, the same inertia force will be experienced at 10,000 r.p.m. and accordingly, the engine would be expected to have essentially the same operating life at 10,000 r.p.m. as an engine with heavier pistons and connecting rods at 7500 r.p.m.

In accordance with the present invention, connecting rods are provided which can be produced from aluminum or aluminum alloys and having an overall weight of somewhat less than 400 grams, for a standard engine or a competition engine having a piston displacement of about 280 to 330 cubic inches.

More particularly, in accordance with the present invention, a piston rod is provided which has a combined H-shaped and tubular cross-section that can sustain stresses up to 75% greater than the stresses on the rod developed by the energy generated by the engine, is more rigid than a standard I-beam or H-beam steel rod weighing more than twice as much, and is stronger in flexure or beam than such rods. The new connecting rods enable an engine provided with lightweight pistons to be operated at much higher r.p.m. with correspondingly higher power outputs and smoother operation, approaching that of a turbine, without danger of failure of the rod either by bending or inertia stresses.

For a better understanding of the present invention, reference may be had to the accompanying drawings, in which:

FIGURE 1 is a front elevational view of a connecting rod embodying the present invention;

FIGURE 2 is a side elevational view thereof;

FIGURE 3 is a view in longitudinal section taken on line 3—3 of FIGURE 2; and

FIGURE 4 is a view in cross-section taken on line 4—4 of FIGURE 1.

The form of connecting rod C shown for purposes of illustration in the drawings includes an upper bearing end portion 10 adapted to receive the piston pin of a piston and, when formed of aluminum or aluminum alloy, need not be provided with the usual piston pin bushing. The lower bearing end 11 of the rod which engages the crank shaft of the engine is of the split type having a cap 12 which can be secured to the lower end of the rod by the usual cap screws 13 and 14 either threaded directly into the rod or into bushings inserted in the rod. As best shown in FIGURE 4, the rod body or shank 15 is of H-shape cross-section having tapering flanges 16, 17, 18 and 19 which extend generally perpendicular to the axes of the bearing portions 10 and 11 of the rod. The flanges 16 to 19 have a thickness of about one-eighth inch at their bases and about three thirty-seconds of an inch at their outer edges and extend outwardly about one-half inch at their inner ends and about three-eighths inch at their outer ends from a generally rectangular central shaft portion 20 extending between the bearing portions 10 and 11 and provided with a central bore 21 about one-half inch in diameter rendering the shaft portion tubular in cross-section and providing a wall thickness of about one-eighth of an inch in the shaft portion 20. The upper end of the bore 21, as shown in FIGURE 3, terminates below the eye or bearing portion 10 at the upper end of the rod and extends downwardly into the bearing portion 11 at the lower end of the rod to enable it to be bored or otherwise formed.

The cap 12 of the rod has thick ends but is reduced in thickness between its ends and has edge flanges 22 and 23 also about the same dimensions as the webs 16 to 19 and of similar cross-section. The flanges 16 to 19 are filleted into the thickened side blocks 24 and 25 of the split bearing 11 to distribute better the stresses in the rod.

As indicated above, the rods, with the exception of the screws 13 and 14, are composed of aluminum or aluminum alloy and the blanks from which the rod is formed are produced by a linear forging operation, as contrasted with casting, in order to orient the grain generally lengthwise of the blank. Such orientation gives the finished rod greater resistance to inertia and combustion forces.

A rod C of the type described formed of linear forged aluminum for use in a 283 cubic inch competition engine, such as, for example, a modified 283 cubic inch Chevrolet racing or competition engine, has a finished weight of 389 grams. Tests of rods of the type described show that they have remarkable strength and operating characteristics despite the problems introduced by the relatively high thermal coefficient of expansion of aluminum and lower physical strength of aluminum in tension and compression, as compared with steel. A rod C having a center-to-center length between the bearing portions of 5.687 inches increases in length 0.016 inch as the temperature increases from 350° F. to 750° F. A steel connecting rod for a 327 c.i.d. Chevrolet engine of the same length has an elongation of .0083 inch. The diametrical growth of the large bearing end for the steel rod is .0013 inch and for aluminum .0031 inch. Compensation for these different growths can, of course, be made in the design of the engine.

Temperature also has an effect on the strength of an aluminum connecting rod. For example, the maximum load the bearing portion 10 can withstand without deformation at 75° F. is 27,800 pounds and 10,000 pounds at 300° F.

At 16 tons tension, the small bearing end 10 of the rod C begins to stretch. A permanent stretch of .040 inch has been observed. In a stock steel rod for a 327 c.i.d. Chevrolet engine, the small end stretches the same amount at 4 tons tension. The big bearing end of the rod C stretches .002 inch at 16 tons, while the big end of the stock rod stretches .075 inch at 4 tons. In addition, cracking of the stock rod at the relief for the bolt heads occurred and deformation of the big end cap was severe at 4 tons.

In tests involving bending or beam stress, stress risers were generated in the webs of the rod C, but even after such risers had been formed, the rod C did not fail on further testing until the tension load was equal to that necessary to fail a stock rod. Upon more severe beam stresses, it was found that the new rod coins at beam loads of 10 tons and fails at higher beam stresses.

Taking all of these factors into consideration and using the 5,800 pound cycle load (inertia forces), the applied stress on the rod C is .375 times the allowable stress. From this factor it can be concluded that the fatigue life of the rod C is approximately $7 \times 10^5$ cycles or a life of approximately 1¼ hours at 10,000 r.p.m. Inasmuch as even competition engines are not operated at full r.p.m. throughout a race of extended duration or mileage, the actual fatigue life is extended beyond that of conventional connecting rods. In all phases of testing, the applicant's rod was superior to stock rods formed of steel and far superior to I-beam or tubular rods of substantially greater weight.

It appears that the reason for the strength of the applicant's rod is the use of a greater amount of metal in the webs 16 to 19 and in the webs 22 and 23 in the cap portion of the main bearing while offsetting this weight increase by using a tubular center section which in itself has great rigidity on the basis of weight and high resistance to compression and tension stresses. In other words, a greater amount of metal can be utilized in the webs for stiffening the rod against bending stresses while the overall columnar shape of the center section with the webs and the use of proper fillets between the webs and bearing portions gives the necessary resistance to elongation under inertia forces, compression under inertia and combustion pressures and bending or beam stresses. In this way, a connecting rod C having less than half the weight of conventional connecting rods and having greater resistance to deformation by stresses has been produced so that the operating speed of a competition or endurance engine can be greatly increased without causing failure of the rods C over long periods of high speed operation.

It will be understood that connecting rods of different lengths and other dimensions may be required for engines having different strokes and other characteristics and, accordingly, the specific example given herein should be considered as illustrative and not as limiting the scope of the following claims.

I claim:

1. A lightweight forged aluminum connecting rod for an internal combustion engine comprising a ring portion for receiving a piston pin, a split ring portion for receiving a crankshaft bearing and a shank interposed between and connecting said ring portions, said shank including a substantially square tubular portion having a circular central bore extending from said split ring portion substantially to said piston pin receiving portion and flanges extending outwardly in opposite directions from opposite sides of said shank portion from one ring portion to the other ring portion substantially perpendicular to the axes of said ring portions to render said shank substantially H-shaped in cross section with the dimensions thereof in the plane of the axes of the ring portions being substantially less than the dimensions between the outer ends of the flanges and transverse to said plane and to provide enhanced resistance to compression, tension and bending stresses; the flanges decreasing in thickness from adjacent to said tubular portion to their outer edges.

2. The connecting rod set forth in claim 1 in which said split ring portion comprises an inner semicircular bearing portion, a detachable outer semicylindrical cap portion having semicircular reinforcing flanges at its edges and threaded means for securing said cap portion to said inner portion.

3. The connecting rod set forth in claim 1 in which said tubular portion has walls at least about one-eighth of an inch minimum thickness and said flanges have a thickness adjacent to said tubular portion of at least about one-eighth of an inch.

References Cited

UNITED STATES PATENTS

| | | | |
|---|---|---|---|
| 1,927,768 | 9/1933 | Birkigt | 74—579 XR |
| 1,981,609 | 11/1934 | Berland | 74—579 XR |

FOREIGN PATENTS

| | | |
|---|---|---|
| 514,359 | 3/1921 | France. |

FRED C. MATTERN, JR., Primary Examiner

F. D. SHOEMAKER, Assistant Examiner